(12) United States Patent
Ueki et al.

(10) Patent No.: US 12,528,324 B2
(45) Date of Patent: Jan. 20, 2026

(54) STRUT MOUNT CAP

(71) Applicant: SUBARU CORPORATION, Tokyo (JP)

(72) Inventors: Keisuke Ueki, Tokyo (JP); Hiroo Kawano, Tokyo (JP); Yasushi Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 490 days.

(21) Appl. No.: 18/113,451

(22) Filed: Feb. 23, 2023

(65) Prior Publication Data

US 2023/0286343 A1    Sep. 14, 2023

(30) Foreign Application Priority Data

Mar. 10, 2022 (JP) .................. 2022-037357

(51) Int. Cl.
*B60G 15/06*     (2006.01)
*F16J 15/02*     (2006.01)
*F16K 15/14*     (2006.01)
*F16F 9/54*      (2006.01)

(52) U.S. Cl.
CPC .......... *B60G 15/068* (2013.01); *F16J 15/022* (2013.01); *F16K 15/14* (2013.01); *B60G 2202/312* (2013.01); *B60G 2204/128* (2013.01); *B60G 2204/40* (2013.01); *F16F 9/54* (2013.01)

(58) Field of Classification Search
CPC .......... B60G 15/06–068; B60G 2202/30–322; B60G 2204/12–1302; B60G 2204/40–4702; F16J 15/022; F16J 13/14; F16K 15/14; F16K 15/147; F16F 9/54; F16F 9/3242; F16F 9/38
See application file for complete search history.

(56) References Cited

U.S. PATENT DOCUMENTS

| | | | | |
|---|---|---|---|---|
| 5,076,725 | A * | 12/1991 | Nakaura | F16F 9/54 267/141.2 |
| 5,788,262 | A * | 8/1998 | Dazy | B60G 15/067 267/293 |
| 7,281,705 | B2 * | 10/2007 | Huprikar | B60G 11/54 267/293 |

FOREIGN PATENT DOCUMENTS

| | | |
|---|---|---|
| JP | S58-22707 A | 2/1983 |
| JP | H07-9828 A | 1/1995 |
| JP | 2002-127449 A | 5/2002 |
| JP | 3669538 B2 | 7/2005 |
| JP | 2013-155781 A | 8/2013 |

(Continued)

*Primary Examiner* — David R Morris
(74) *Attorney, Agent, or Firm* — MCGINN I.P. LAW GROUP, PLLC

(57) ABSTRACT

A strut mount cap is provided on an upper surface of a strut mount, and is configured to close a hole housing a fastening component for the strut mount and a shock absorber. The strut mount cap includes a cap body configured to close the hole, an annular water stop lip provided on an outer periphery of the cap body and in elastic contact with the upper surface of the strut mount to prevent water from entering the hole, a press-fit tube provided on a back side of the cap body and held on an inner peripheral surface of the hole by being press-fitted into the hole, and a check valve configured to open the hole when an internal pressure in the hole is equal to or higher than a preset pressure, and close the hole when the internal pressure is lower than the preset pressure.

16 Claims, 5 Drawing Sheets

(56) References Cited

FOREIGN PATENT DOCUMENTS

| JP | 2013-194803 A | | 9/2013 | |
|---|---|---|---|---|
| KR | 20080071336 A | * | 8/2008 | ............ F16F 9/3242 |

* cited by examiner

STRUT MOUNT CAP

CROSS-REFERENCE TO RELATED APPLICATIONS

The present application claims priority from Japanese Patent Application No. 2022-037357 filed on Mar. 10, 2022, the entire contents of which are hereby incorporated by reference.

BACKGROUND

The disclosure relates to a strut mount cap that prevents water from entering a hole housing a fastening component for a strut mount and a shock absorber.

In the related art, a strut suspension device is known as a suspension device installed in a vehicle such as an automobile. A shock absorber constituting the strut suspension device is fastened to a strut mount provided on a vehicle body. In general, a metal nut or the like is used as a fastening component for the shock absorber and the strut mount. The fastening component is housed in a hole formed in the strut mount. In order to prevent rust from occurring in the fastening component due to water entering the hole, an upper part of the hole is water-tightly sealed by a strut mount cap (hereinafter, simply referred to as the "cap"). The cap is formed of a synthetic resin material or an elastic material such as a rubber material.

In order to prevent such a cap from rising or falling off due to traveling vibration of the vehicle, various techniques are proposed in the related art. For example, Japanese Patent No. 3669538 discloses a technique of providing a protrusion and a groove in a cap press-fit member and holding a cap to a hole by a frictional force due to elastic deformation of the cap press-fit member.

SUMMARY

An aspect of the disclosure provides a strut mount cap provided on an upper surface of a strut mount and configured to close a hole housing a fastening component for the strut mount and a shock absorber. The strut mount cap includes a cap body, an annular water stop lip, a press-fit tube, and a check valve. The cap body is configured to close the hole. The annular water stop lip is provided on an outer periphery of the cap body, and in elastic contact with the upper surface of the strut mount to prevent water from entering the hole. The press-fit tube is provided on a back side of the cap body and held on an inner peripheral surface of the hole by being press-fitted into the hole. The check valve is configured to open the hole when an internal pressure in the hole is equal to or higher than a preset pressure, and close the hole when the internal pressure is lower than the preset pressure.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

For example, when a suspension device is disposed in an engine room, air sealed in a hole by a cap expands by heat received from an engine or the like. Therefore, in the technique disclosed in Japanese Patent No. 3669538, in order to ensure water tightness of the hole by the cap, measures are used such as setting, in the cap press-fit member, a high releasing load that can withstand an internal pressure in the hole during thermal expansion. When such a high releasing load is set, a press-fit load of the cap press-fit member into the hole is high, and there is improvement since assemblability of the cap to the hole may be hindered.

It is desirable to provide a cap that can be easily assembled to a hole and that can ensure water tightness of the hole.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
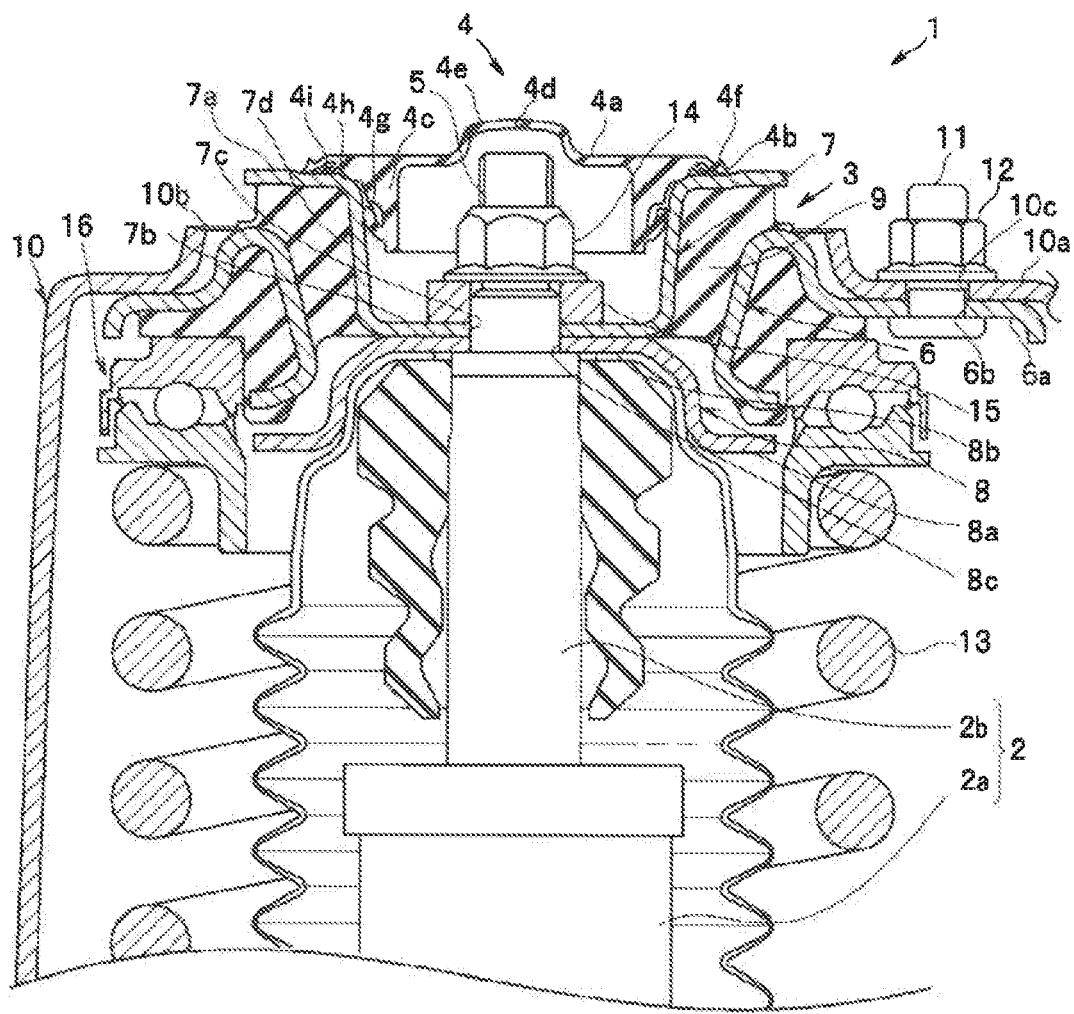
FIG. 1 is a cross-sectional view of main members of a suspension device.
Figure 2:
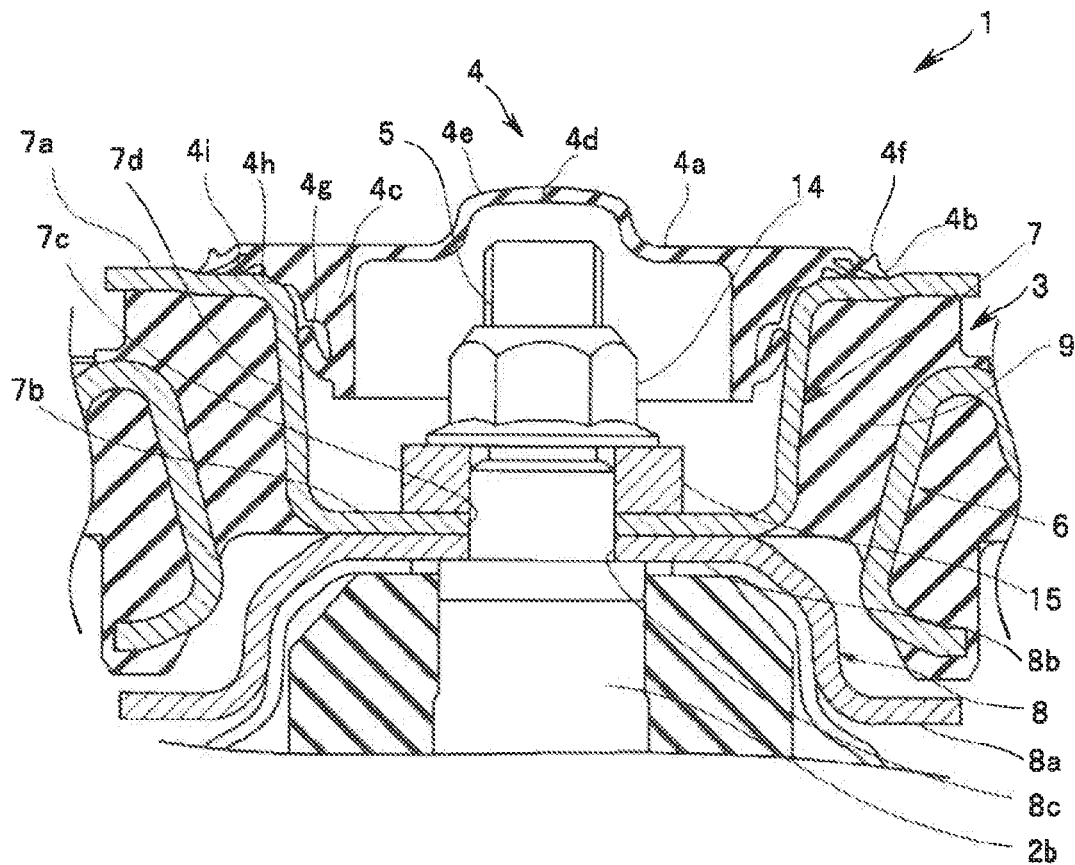
FIG. 2 is an enlarged cross-sectional view of the main members of the suspension device.
Figure 3:
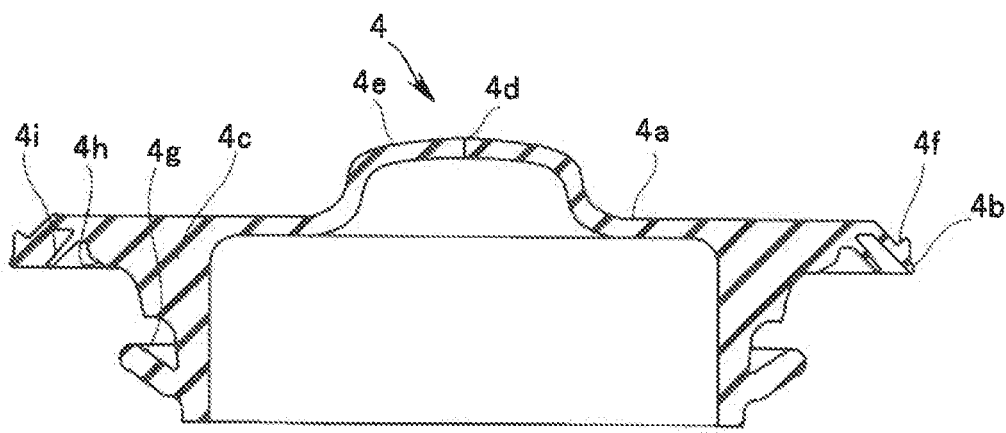
FIG. 3 is a cross-sectional view of a strut mount cap.
Figure 4:
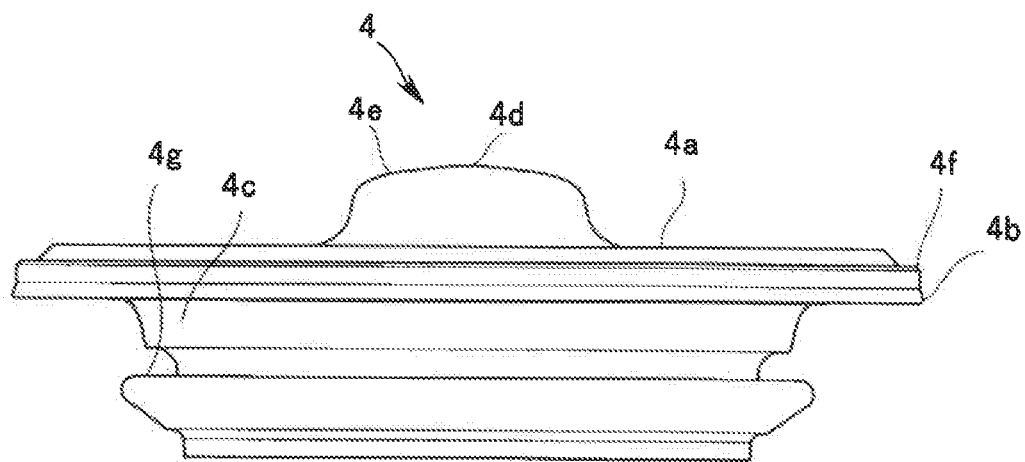
FIG. 4 is a side view of the strut mount cap.
Figure 5:
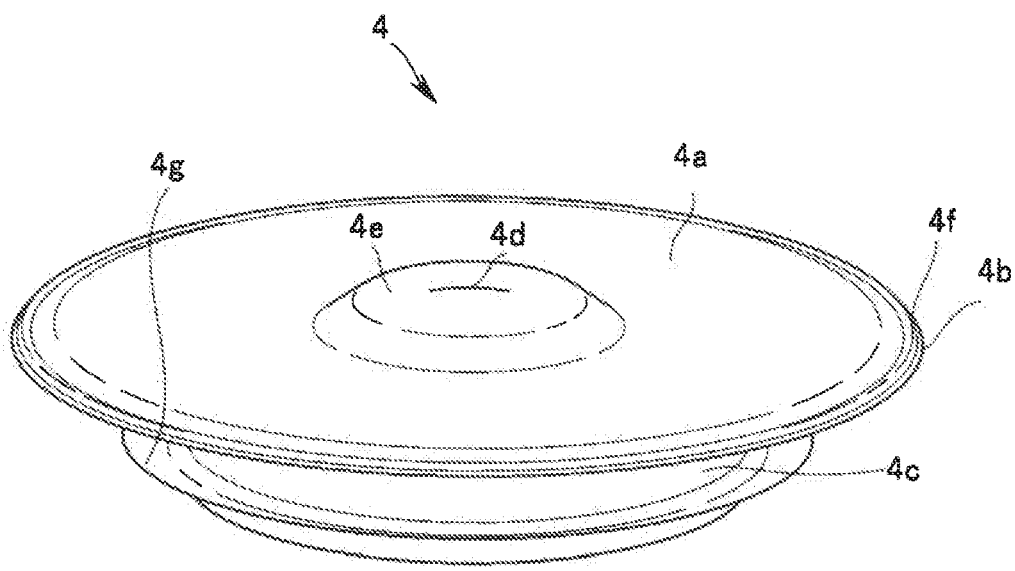
FIG. 5 is a perspective view of the strut mount cap as viewed obliquely from above.
Figure 6:
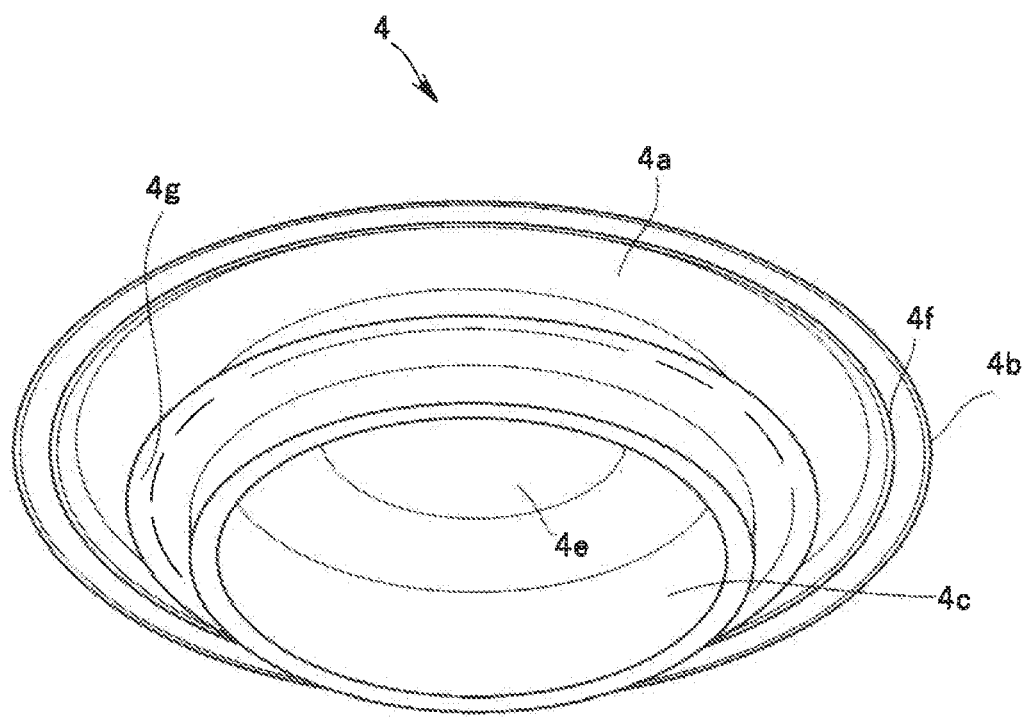
FIG. 6 is a perspective view of the strut mount cap as viewed obliquely from below.
Figure 7:
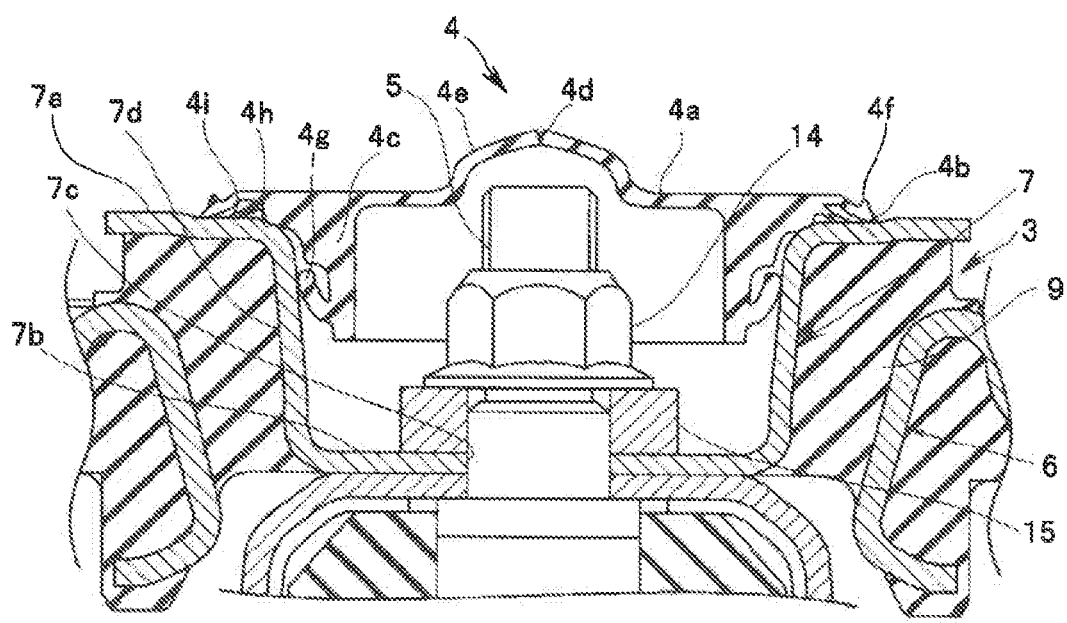
FIG. 7 is a cross-sectional view of the main members of the suspension device illustrating a state of a check valve when an internal pressure in a hole increases.
Figure 8:
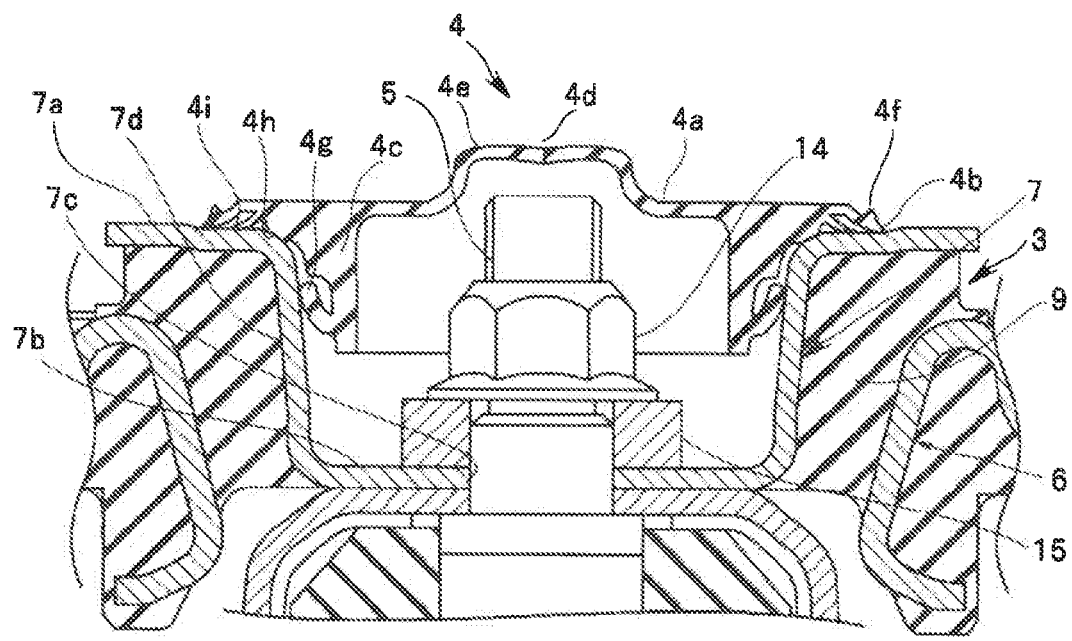
FIG. 8 is a cross-sectional view of the main members of the suspension device illustrating a state of the check valve when the internal pressure in the hole decreases.

The drawings relate to the embodiment of the disclosure. FIG. 1 is a cross-sectional view of main members of a suspension device. FIG. 2 is an enlarged cross-sectional view of the main members of the suspension device. FIG. 3 is a cross-sectional view of a strut mount cap. FIG. 4 is a side view of the strut mount cap. FIG. 5 is a perspective view of the strut mount cap as viewed obliquely from above. FIG. 6 is a perspective view of the strut mount cap as viewed obliquely from below. FIG. 7 is a cross-sectional view of the main members of the suspension device illustrating a state of a check valve when an internal pressure in a hole increases. FIG. 8 is a cross-sectional view of the main members of the suspension device illustrating a state of the check valve when the internal pressure in the hole decreases.

As illustrated in FIG. 1, the suspension device according to the embodiment is, for example, a strut suspension device that supports a wheel (not illustrated) at a front side of a vehicle body. A suspension device 1 is provided on a strut tower 10 provided in an engine room of the vehicle body.

The suspension device 1 includes a shock absorber 2, a strut mount 3, and a strut mount cap 4.

The shock absorber 2 includes a cylinder 2a and a piston rod 2b that is reciprocally inserted through and supported by the cylinder 2a in a manner of being movable forward and backward. A lower end of the cylinder 2a is fixed to the wheel.

The piston rod 2b protrudes upward from the cylinder 2a. A bolt 5 that fastens the piston rod 2b to the strut mount 3 is provided at an upper end of the piston rod 2b.

The strut mount 3 includes an outer tubular member 6, an inner tubular member 7, a lower tubular member 8, and an elastic body 9.

The outer tubular member 6 includes, at an upper end, an outward flange 6a extending in an outer diameter direction of the outer tubular member 6. The outward flange 6a is provided with, in multiple locations (one location is illustrated in FIG. 1), a bolt hole 6b through which the outer tubular member 6 is attached to the strut tower 10.

The inner tubular member 7 is disposed inside the outer tubular member 6. The inner tubular member 7 includes, at an upper end, an outward flange 7a extending in an outer diameter direction of the inner tubular member 7.

The inner tubular member 7 includes, at a lower end, a lower end wall 7b. The lower end wall 7b is provided with, at a center, a bolt hole 7c through which the bolt 5 of the piston rod 2b is inserted.

The lower tubular member 8 is disposed under the inner tubular member 7. The lower tubular member 8 includes, at a lower end, an outward flange 8a extending in an outer diameter direction of the lower tubular member 8.

The lower tubular member 8 includes, at an upper end, an upper end wall 8b. The upper end wall 8b is provided with, at a center, a bolt hole 8c through which the bolt 5 of the piston rod 2b is inserted.

The elastic body 9 is formed of a rubber member or the like. The elastic body 9 is permanently bonded by vulcanization to an inner peripheral surface and an outer peripheral surface of the outer tubular member 6 and an outer peripheral surface of the inner tubular member 7. The outer tubular member 6 and the inner tubular member 7 are permanently coupled to each other by the elastic body 9. The upper end wall 8b of the lower tubular member 8 is coupled to the lower end wall 7b of the inner tubular member 7 by caulking or the like. The inner tubular member 7 and the lower tubular member 8 are displaceable with respect to the outer tubular member 6 by elastic deformation of the elastic body 9.

The strut mount 3 implemented as described above is inserted, from below, into an opening 10b formed in an upper wall 10a of the strut tower 10.

The outward flange 6a of the outer tubular member 6 is abutted against the upper wall 10a of the strut tower 10 from below.

Further, each of the bolt holes 6b of the outward flange 6a is positioned with respect to a respective one of bolt holes 10c (one location is illustrated in FIG. 1) provided in the upper wall 10a.

Each of bolts 11 is inserted through a respective set of the positioned bolt holes 6b and 10c from below the outward flange 6a. By screwing nuts 12 to the bolts 11, the strut mount 3 is fixed to the strut tower 10 by fastening.

The bolt 5 of the piston rod 2b is inserted through the bolt hole 8c of the lower tubular member 8 and the bolt hole 7c of the inner tubular member 7. A nut 14 is screwed to the bolt 5 from above the strut mount 3 (that is, from an inner tubular member 7 side). Thus, the piston rod 2b is integrally fastened to the inner tubular member 7 and the lower tubular member 8. That is, the shock absorber 2 is attached to the strut mount 3 by fastening.

Here, the bolt 5 and the nut 14, which are coupling components that couple the strut mount 3 and the shock absorber 2, are housed in a hole defined in the strut mount 3. In the embodiment, the hole has a tubular shape by the lower end wall 7b of the inner tubular member 7 and a side wall 7d of the inner tubular member 7. The hole has an opening at an upper part thereof. An upper surface of the strut mount 3 is implemented by the outward flange 7a of the inner tubular member 7 in an outer diameter direction of the opening. As described above, the bolt 5 and the nut 14, which are fastening components, are housed inside the hole lower than the upper surface of the strut mount 3.

A washer 15 is disposed between the nut 14 and the lower end wall 7b of the inner tubular member 7. The washer 15 is pressed against the lower end wall 7b by a fastening force of the nut 14 screwed to the bolt 5. The bolt hole 7c is liquid-tightly sealed in by pressing the washer 15.

A coil spring 13 that elastically receives vertical movement of the wheel with respect to the vehicle body is disposed outside the shock absorber 2. An upper end of the coil spring 13 is supported below the outward flange 6a via a bearing 16 attached to the elastic body 9.

The strut mount cap 4 (hereinafter, simply referred to as the "cap 4") is a permanently molded product formed of a rubber member or the like. As illustrated in FIGS. 1 and 2, the cap 4 is provided to prevent water from entering the hole that houses the fastening components for the strut mount 3 and the shock absorber 2. That is, the cap 4 water-tightly seals the hole to prevent rust of the bolt 5 and the nut 14 which are fastening components. The cap 4 is attached to the hole in an upper part of the strut mount 3 by being pressed from above.

As illustrated in FIGS. 2, 3, and 4, the cap 4 includes a cap body 4a, a water stop lip 4b, a press-fit tube 4c, and a check valve 4d.

The cap body 4a is a substantially disk-shaped member for closing the hole. The cap body 4a includes a dome 4e protruding upward. In the embodiment, the dome 4e is a center of the cap body 4a and is disposed at a position facing the bolt 5.

The water stop lip 4b has an annular shape on an outer periphery of the cap body 4a.

An outer diameter of the water stop lip 4b is sufficiently larger than a diameter of the opening of the hole. A wall thickness of the water stop lip 4b is smaller than a wall thickness of the cap body 4a. Thus, when the cap body 4a closes the hole, the water stop lip 4b can elastically adhere to the upper surface of the strut mount 3 (that is, an upper surface of the outward flange 7a). The water stop lip 4b can prevent (stop) water from entering the hole by the adhesion.

In order to improve a water stop effect of the hole, for example, as illustrated in FIGS. 2 and 3, it is desirable to provide an annular water stop auxiliary lip 4i on an inner peripheral side of the water stop lip 4b.

In order to reinforce the water stop lip 4b whose wall thickness is small and effectively prevent deformation such as curling of the water stop lip 4b, it is desirable to provide an annular reinforcing protrusion 4f on an upper surface side of the water stop lip 4b. The reinforcing protrusion 4f protrudes, for example, substantially at a center in a radial direction (width direction) of the water stop lip 4b having the annular shape.

The press-fit tube 4c can be press-fitted into the side wall 7d of the hole and has a substantially cylindrical shape. The press-fit tube 4c is provided on a back side of the cap body 4a on an inner peripheral side than the water stop lip 4b (and the water stop auxiliary lip 4i) (see FIGS. 5 and 6).

A press-fit lip 4g and a stopper 4h are formed on an outer peripheral surface of the press-fit tube 4c.

The press-fit lip 4g is an annular lip protruding obliquely upward in an outer diameter direction of the press-fit tube 4c from a lower end side of the press-fit tube 4c. The press-fit lip 4g is elastically deformed when press-fitted into the hole. The press-fit lip 4g that is elastically deformed generates a repulsive elastic force in the outer diameter direction of the press-fit tube 4c. Thus, the press-fit tube 4c is fixed to the side wall 7d of the hole.

The stopper 4h is provided at an upper end of the press-fit tube 4c. The stopper 4h is abutted against a bent part between the outward flange 7a and the side wall 7d of the inner tubular member 7.

Therefore, an abutment surface of the stopper 4h is formed of a plane inclined with respect to the outward flange 7a and the side wall 7d.

The stopper 4h defines a press-fit position (press-fit depth) of the press-fit tube 4c into the hole by being abutted against the inner tubular member 7. The press-fit position into the hole is a position at which the water stop lip 4b (and the water stop auxiliary lip 4i) may be abutted against the upper surface of the strut mount 3 in a state in which the water stop lip 4b (and the water stop auxiliary lip 4i) is elastically deformed.

In order to improve the water stop effect by the cap 4, the stopper 4h may also assist water stopping.

The check valve 4d is implemented by, for example, a slit provided in the dome 4e of the cap body 4a (see FIG. 5).

As illustrated in FIG. 7, the check valve 4d opens an internal space of the hole to the outside when the internal pressure in the hole is equal to or higher than a preset pressure.

Meanwhile, as illustrated in FIG. 8, the check valve 4d water-tightly closes (seals) the internal space of the hole when the internal pressure in the hole is lower than the preset pressure.

In order to properly release the check valve 4d when the internal pressure in the hole is equal to or higher than the preset pressure, various conditions such as a wall thickness of the dome 4e, a shape of the dome 4e, and a length of the slit are obtained in advance from an experiment, a simulation, and the like.

According to such an embodiment, the strut mount cap 4 includes: the cap body 4a configured to close a hole housing a fastening component; the annular water stop lip 4b provided on an outer periphery of the cap body 4a and in elastic contact with an upper surface of the strut mount 3 to prevent water from entering the hole; the press-fit tube 4c provided on a back side of the cap body 4a and held on an inner peripheral surface of the hole by being press-fit into the hole; and the check valve 4d configured to open the hole when an internal pressure in the hole is equal to or higher than a preset pressure, and close the hole when the internal pressure in the hole is lower than the preset pressure. With such a configuration, the strut mount cap 4 can be easily assembled to the hole, and can implement excellent water tightness of the hole.

That is, the cap 4 includes the check valve 4d that opens the hole when the internal pressure in the hole closed by the cap body 4a is equal to or higher than the preset pressure. Due to an action of the check valve 4d, even when a temperature inside the engine room is high and air inside the hole thermally expands, the internal pressure in the hole can be always kept lower than the preset pressure. Therefore, when compared with a cap without the check valve 4d, the cap 4 can be prevented from rising and falling off from the hole even when a releasing load of the press-fit tube 4c (press-fit lip 4g) from the hole is small. By preventing the cap 4 from rising and falling off from the hole, the water stop lip 4b can be always in elastic contact with the upper surface of the strut mount 3, and the excellent water tightness of the hole can be implemented.

In addition, the check valve 4d seals the hole when the internal pressure in the hole is lower than the preset pressure. In a state in which the hole is sealed as described above, air inside the hole is thermally contracted when the temperature inside the engine room decreases, and the internal pressure in the hole is converted to a negative pressure. Therefore, the water stop lip 4b can be in more proper and elastic contact with the upper surface of the strut mount 3, and the excellent water tightness of the hole can be further improved.

Setting the releasing load to be small directly leads to a reduction in the press-fit load of the press-fit tube 4c into the hole. The cap 4 can be easily assembled to the hole by setting the press-fit load to be small as described above.

In this case, the check valve 4d is implemented by a slit that is formed in the dome 4e protruding upward from the cap body 4a. As described above, the slit formed in the dome 4e is easily opened toward a protrusion direction of the dome 4e and is not easily opened toward a side opposite to the protrusion direction of the dome 4e. Therefore, the check valve 4d can be implemented by a simple structure of providing a slit in the cap 4.

The dome 4e is provided at a position facing the bolt 5 that is disposed inside the hole. Therefore, even when the internal pressure in the hole is greatly changed to the negative pressure, deformation of the dome 4e toward the hole is restricted by abutment between the dome 4e and the bolt 5. Thus, it is possible to properly prevent the check valve 4d from being opened due to the decrease in the internal pressure in the hole.

The press-fit tube 4c includes the press-fit lip 4g that is elastically deformed between the press-fit tube 4c and an inner peripheral surface of the hole. The releasing load and the press-fit load of the press-fit tube 4c with respect to the hole can be easily set by adjusting a wall thickness of the press-fit lip 4g and the like.

The water stop lip 4b includes the annular reinforcing protrusion 4f on an upper surface side. By providing the reinforcing protrusion 4f, it is possible to properly prevent the water stop lip 4b from curling even when the wall thickness of the water stop lip 4b is small. Therefore, it is possible to improve assembling workability of the cap 4 to the hole. Since the wall thickness of the water stop lip 4b is small, the water stop lip 4b can be easily elastically deformed, and adhesion of the water stop lip 4b to the upper surface of the strut mount 3 can be improved.

The press-fit tube 4c includes the stopper 4h that defines a press-fit position of the press-fit tube 4c into the hole. Thus, even when the internal pressure in the hole is the negative pressure due to an action of the check valve 4d, it is possible to prevent the press-fit tube 4c from excessively entering the hole. Therefore, the position of the water stop lip 4b relative to the upper surface of the strut mount 3 can always be an appropriate position, and high water stop performance can be maintained.

The technique described in the embodiment is not limited to the embodiment, and moreover, various modifications can be made within a range not departing from the concept of the disclosure in a practice stage. Furthermore, the above-described embodiment includes techniques in various stages, and various techniques can be derived by appropriately combining the elements disclosed herein.

For example, in the above-described embodiment, an example in which the check valve is implemented by the slit is described, but the disclosure is not limited thereto, and may adopt a check valve having another configuration.

When the above-described problem is solved and the above-described effects are obtained even when certain elements are removed from all elements described in the above-described embodiment, the configuration in which the elements are removed can be derived as a technique of the disclosure.

The invention claimed is:

1. A strut mount cap provided on an upper surface of a strut mount and configured to close a hole housing a fastening component for the strut mount and a shock absorber, the strut mount cap comprising:
   a cap body configured to close the hole;
   an annular water stop lip provided on an outer periphery of the cap body, the annular water stop lip being in elastic contact with the upper surface of the strut mount to prevent water from entering the hole;
   a press-fit tube provided on a back side of the cap body and held on an inner peripheral surface of the hole by being press-fitted into the hole; and
   a check valve configured to open the hole when an internal pressure in the hole is equal to or higher than a preset pressure, and close the hole when the internal pressure is lower than the preset pressure.

2. The strut mount cap according to claim 1, wherein the cap body comprises a dome protruding upward, and the check valve is a slit formed in the dome.

3. The strut mount cap according to claim 2, wherein the press-fit tube comprises, at a portion facing the inner peripheral surface of the hole, a press-fit lip that is configured to be elastically deformed.

4. The strut mount cap according to claim 3, wherein the water stop lip comprises an annular reinforcing protrusion on an upper surface side.

5. The strut mount cap according to claim 4, wherein the press-fit tube comprises a stopper configured to define a press-fit position of the press-fit tube into the hole.

6. The strut mount cap according to claim 3, wherein the press-fit tube comprises a stopper configured to define a press-fit position of the press-fit tube into the hole.

7. The strut mount cap according to claim 2, wherein the water stop lip comprises an annular reinforcing protrusion on an upper surface side.

8. The strut mount cap according to claim 7, wherein the press-fit tube comprises a stopper configured to define a press-fit position of the press-fit tube into the hole.

9. The strut mount cap according to claim 2, wherein the press-fit tube comprises a stopper configured to define a press-fit position of the press-fit tube into the hole.

10. The strut mount cap according to claim 1, wherein the press-fit tube comprises, at a portion facing the inner peripheral surface of the hole, a press-fit lip that is configured to be elastically deformed.

11. The strut mount cap according to claim 10, wherein the water stop lip comprises an annular reinforcing protrusion on an upper surface side.

12. The strut mount cap according to claim 11, wherein the press-fit tube comprises a stopper configured to define a press-fit position of the press-fit tube into the hole.

13. The strut mount cap according to claim 10, wherein the press-fit tube comprises a stopper configured to define a press-fit position of the press-fit tube into the hole.

14. The strut mount cap according to claim 1, wherein the water stop lip comprises an annular reinforcing protrusion on an upper surface side.

15. The strut mount cap according to claim 14, wherein the press-fit tube comprises a stopper configured to define a press-fit position of the press-fit tube into the hole.

16. The strut mount cap according to claim 1, wherein the press-fit tube comprises a stopper configured to define a press-fit position of the press-fit tube into the hole.

* * * * *